July 3, 1945.    R. B. COTTRELL    2,379,626
SNUBBER
Filed March 30, 1942    2 Sheets-Sheet 1
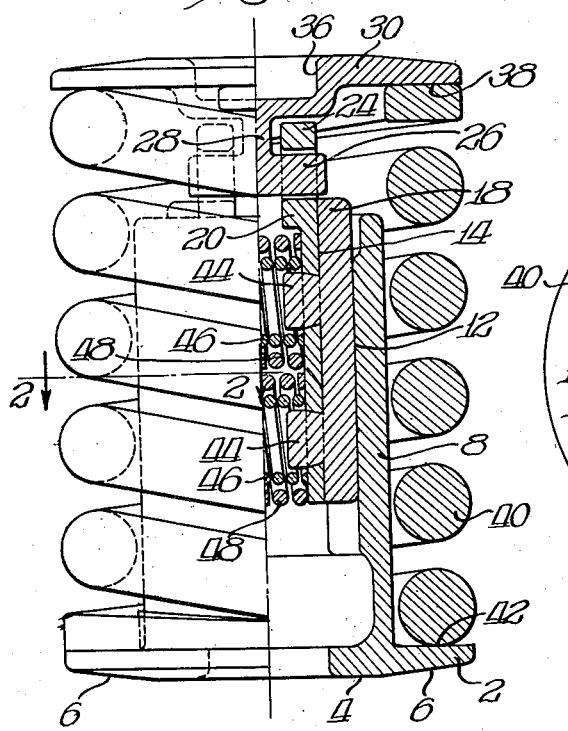
INVENTOR.
Robert B. Cottrell
BY
ATTORNEY July 3, 1945. R. B. COTTRELL 2,379,626
SNUBBER
Filed March 30, 1942 2 Sheets-Sheet 2
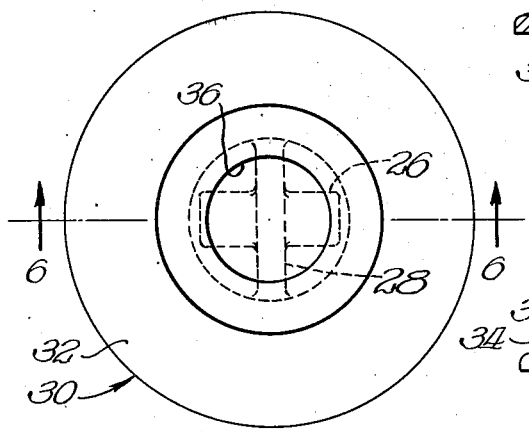
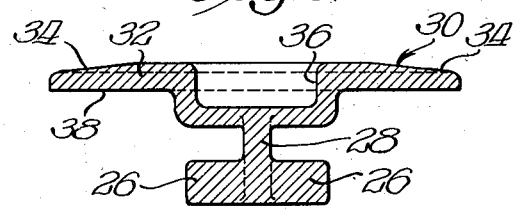
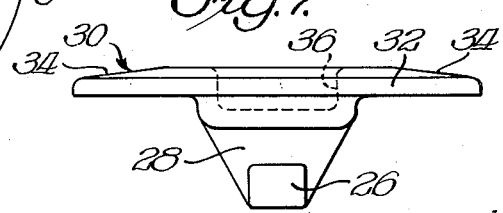
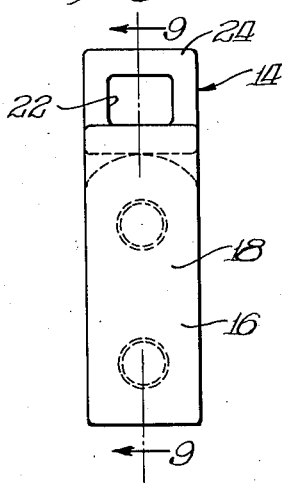
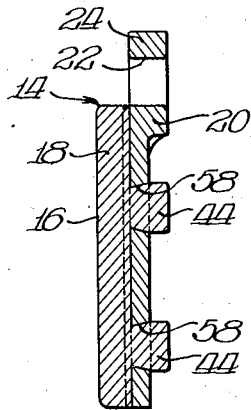
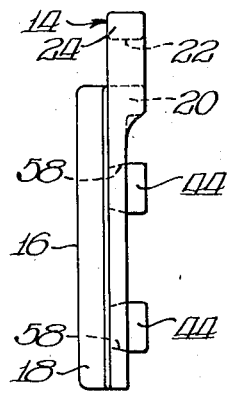
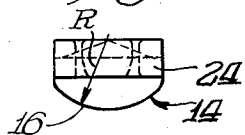
INVENTOR.
Robert B. Cottrell
BY
ATTORNEY.

Patented July 3, 1945

2,379,626

UNITED STATES PATENT OFFICE 2,379,626

SNUBBER

Robert B. Cottrell, Chicago, Ill., assignor to American Steel Foundries, Chicago, Ill., a corporation of New Jersey Application March 30, 1942, Serial No. 436,803

12 Claims. (Cl. 267—9)

My invention relates to a friction device and especially such a device for use on railway equipment commonly in conjunction with coil springs in a spring group. My novel device has a general form and arrangement suitable to permit its substitution for one or more of the coils in a spring group.

The general object of my invention is to devise a practical form of friction device of the character above indicated which may act as a means of damping the oscillations of coil springs with which it may be associated and thus reducing or eliminating harmonic spring action in a spring group.

A specific object of my invention is to devise a snubber comprising a barrel follower arranged for the reception of a pair of friction shoes which may be actuated by means interconnecting said shoes with a spaced follower, said shoes and said barrel follower being enclosed within a compression spring.

Another object of my invention is to devise a novel form of friction follower comprising a cylindrical friction barrel which may be formed with sets of internal friction surfaces which may be alternately used, thus increasing the length of life of the device as a whole. In my novel arrangement said friction surfaces may be arranged in two pairs along the axes disposed at right angles to each other and either pair of said surfaces may be utilized. If desired, one pair of said surfaces may be worn to a substantial degree and then the position of the friction shoes may be shifted to the other pair of friction surfaces which may in turn be worn to whatever degree may prove suitable.

My invention comprehends a novel form of friction shoe comprising a cylindrical friction surface of suitable material for engagement with the adjacent barrel friction surface. The said friction portion of the shoe may be normally produced of cast iron for wear against a cast steel friction barrel since such surfaces have been proved to give satisfactory wear when in constant frictional engagement. The said cast iron portion of the friction shoe, however, is not suitable for shock resisting purposes and accordingly the supporting portion of the shoe may be made of steel of such form as to afford a convenient means of connection to the other follower of the friction device.

A different object of my invention is to devise such a snubber as that described wherein friction shoes of the character referred to may have a convenient means for removable and tiltable connection to actuating means on one of the followers.

My invention comprehends an arrangement which is designed to render satisfactory service over a relatively long period during which the frictional absorption may be substantially constant and to afford alternate friction surfaces for successive wear as already described while at the same time meeting all necessary manufacturing conditions and such standards as may be required in the industry.

In the drawings,

Figure 1 is a side elevation, half in section, of my novel form of friction device, the section being taken substantially in the vertical plane bisecting the device as indicated by the line 1—1 of Figure 2.

Figure 2 is a top plan view, half in section, the section being taken approximately in the horizontal plane bisecting the snubber as indicated by the line 2—2 of Figure 1.

Figures 3 and 4 illustrate my novel form of housing follower, Figure 3 being a top plan view thereof and Figure 4 a sectional view in a vertical plane bisecting the follower as indicated by the line 4—4 of Figure 3.

Figures 5, 6 and 7 show the detail of my other form of follower, Figure 5 being a top plan view thereof, Figure 6 a sectional view in a vertical plane bisecting the follower as indicated by the line 6—6 of Figure 5, and Figure 7 a view in elevation taken from the right as seen in Figure 5.

Figures 8 to 11 inclusive show the detail form of my novel friction shoe, Figure 8 being a view in elevation thereof taken from the friction face side and Figure 9 a sectional view in the vertical plane bisecting the shoe as indicated by the line 9—9 of Figure 8, Figure 10 a side elevation, and Figure 11 a top plan view.

Describing my novel snubber in detail, it may be noted that the housing follower 2, here illustrated in the bottom position, comprises a base portion 4, cylindrical in form and tapered about the perimeter thereof as indicated at 6, 6, said housing follower having integral therewith a barrel portion 8 on the inner face of which may be formed two pairs of friction surfaces 10, 10 and 10, 10, said pairs being arranged along axes approximately at right angles to each other as well seen in the plan view of Figure 3. The detail of this housing follower will be further elaborated hereinafter. The said housing follower may be formed of cast steel in order to afford satisfactory frictional engagement as at 12 with each abutting friction shoe 14, the detail of which is shown in Figures 8 to 11 inclusive. Each friction shoe may have an outer friction face 16 of arcuate form, the arc of said face being defined by a radius R indicated in Figures 3 and 11 so that the friction surface of each shoe is complementary in form to that of the friction face of the barrel or housing follower against which it may seat. The said radius R, as clearly shown in Figure 3, is substantially shorter than the internal radius of the barrel or housing, thus serving to restrain the shoes against rotation within the housing. Each friction shoe 14 may be formed of two distinct portions, the friction member 18 which may seat against the friction surface of the adjacent housing and the carrier portion 20 which may be formed of cast steel in order to give it a shock proof quality which it would not be possible to afford in cast iron material such as is used in the friction portion of the shoe. At the top of the carrier portion of each shoe may be formed a rectangular opening 22 defined by the yoke-like top portion of said carrier, designated 24, and in assembly said opening may receive a lug 26 conveniently fitting therewithin, a pair of said lugs being formed on opposite sides of the stem 28 formed as an integral portion of the cap follower generally designated 30, said cap follower having a base portion 32 chamfered about its outer perimeter as at 34, 34, said base also having on its outer face a central recess 36 which may conveniently receive positioning means afforded on a supporting or supported member. The lug 26 on the follower 30 may fit within the eye or opening 22 in such manner as to allow some tilting action of the follower with respect to the shoe, thus permitting some eccentricity of the follower with respect to the shoes and avoiding high concentration of loads on any area of the friction surface as otherwise might occur if such tilting or eccentricity were not accommodated.

As illustrated in Figure 1, the cap follower 30 is shown as the top follower and the barrel or housing follower is shown as the bottom follower but it will readily be understood that the device will function equally well without regard to the respective positions of the followers. The cap follower 30 affords an annular seat as at 38 for the compression spring 40 within which may be confined the barrel portion of the opposite follower 2 which likewise affords a seat for said spring as at 42.

The carrier portion 20 of each friction shoe presents on its inner face a plurality of raised lugs 44, 44, each affording positioning means for a plurality of concentric inner and outer coil springs 46 and 48 respectively, said springs 46 and 48 being under direct compression between the opposed friction shoes 14, 14.

The operation of the device after assembly will be clearly apparent to those skilled in the art. In the operation of assembly the friction shoes with the springs 46 and 48 compressed therebetween may be mounted on the end cap follower 30 and the ends of the shoes entered into the open end of the barrel or friction follower 2 around which the outer compression spring 40 may theretofore have been mounted. Pressure may then be applied to the followers to force the friction shoes into their normal assembled position with the desired free height.

In the detail of Figures 3 and 4 showing the barrel or friction follower, it may be noted that the barrel portion 8 has a substantially cylindrical outer face while the inner face thereof is divided into four substantially identical friction surfaces 10, 10 as already referred to, said friction surfaces being formed in opposed pairs along axes approximately at right angles to each other so that either pair of friction faces on the barrel may be utilized as desired or they may be alternately used in order that the friction wear may be substantially constant on all of said surfaces. The friction surfaces 10, 10 are terminated short of the top of the barrel portion 8, the wall of said barrel portion 8 being relieved somewhat adjacent the upper end thereof as at 50 in order to accommodate the assembly of the shoes therewith as by entering the ends of said shoes into the widened open end of said barrel portion 8. After the ends of said shoes are so placed in the open end of the barrel, they may be forced over the rounded annular shoulder at 52, thus completing the assembly operation. It may be further noted that the barrel portion 8 is relieved as at 54 adjacent the base portion 4, thus permitting the extremities of the shoes to be forced inwardly of the friction surfaces 10, 10 and avoiding the formation of shoulders on the friction barrel 8 as otherwise might take place. The base 4 may also have a central opening 56 which may afford a convenient means of positioning the adjacent end of the follower with respect to a supporting or supported member.

The detail of the end cap follower is shown in Figures 5, 6 and 7. Most of the features thereof have already been referred to including the circular base 32, the central recess 36, the projecting integral stem 28 at the extremity of which may be formed the shoe connecting lugs 26, 26. The stem 28 may have a relatively wide base portion tapering toward the narrower end at which may be formed the before-mentioned lugs 26, 26, the tapering form of said stem being clearly shown in the side elevation of Figure 7.

The detail of my novel form of friction shoe is shown in Figures 8 to 11 inclusive. The said friction shoe may be formed of two portions, the main or carrier portion thereof being a plate-like steel member having at one end thereof the yoke 24 within which the eye 22 may form a convenient means of connection to an associated lug 26 already referred to. The steel carrier plate portion 20 may have a plurality of openings 58, 58 centrally formed therein, said openings being formed with tapering edges as clearly seen in the views of Figures 9 and 10, and the iron friction portion 18 of each shoe may be cast on to the steel carrier member 20. In the casting operation the lugs 44, 44 may be cast in the openings 58, 58, said lugs thus acting as rivet-like means for securing the cast portion 18 to the steel carrier plate 20 and said lugs also affording positioning means for the springs 46 and 48 as already described.

It will thus be seen that I have devised a novel form of friction device admirably suitable for the purpose described and so arranged as to accommodate a maximum of frictional wear while at the same time affording an arrangement which will develop substantially constant friction throughout its period of use.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction device, spaced followers, a compression spring therebetween, one of said followers having an integral friction housing with a series of internal arcuate friction surfaces therearound, certain of said surfaces being arranged along axes in planes substantially at right angles to each other, a pair of friction shoes selectively receivable in said housing to seat against opposed friction surfaces of either pair, resilient means under compression between said friction shoes, and means on the other of said followers for actuating said shoes, each of said friction shoes comprising a steel plate connected to the actuating follower and an iron portion integrally cast thereto for frictional engagement with said housing, each of the friction surfaces on said housing being defined by a radius substantially shorter than the internal radius of said housing.

2. In a friction device, spaced followers, a compression spring therebetween, one of said followers having an integral friction housing with a series of internal arcuate friction surfaces therearound, certain of said surfaces being arranged along axes in planes substantially at right angles to each other, a pair of friction shoes selectively receivable in said housing to seat against opposed friction surfaces of either pair, resilient means under compression between said friction shoes, and means on the other of said followers for actuating said shoes, each of said friction shoes comprising a steel plate connected to the actuating follower and an iron portion integrally cast thereto for frictional engagement with said housing.

3. In a friction device, opposed followers, a compression spring therebetween, one of said followers having an integral friction barrel with pairs of opposed internal friction surfaces arranged along axes in planes substantially at right angles to each other, a pair of opposed friction shoes seated against certain of said surfaces, resilient means under compression between said shoes, and means on the other of said followers for actuating said shoes, each of said friction shoes comprising a steel plate connected to the actuating follower and an iron portion integrally cast thereto for frictional engagement with said barrel, each of the friction surfaces on said barrel being defined by a radius substantially shorter than the internal radius of said barrel.

4. In a friction device, spaced followers, a compression spring therebetween, one of said followers having an integral friction housing with a series of internal arcuate friction surfaces therearound, certain of said surfaces being arranged along axes in planes substantially at right angles to each other, a pair of friction shoes selectively receivable in said housing to seat against opposed friction surfaces of either pair, resilient means under compression between said friction shoes, and means on the other of said followers for actuating said shoes, each of said friction surfaces on said housing being defined by a radius substantially shorter than the internal radius of said housing.

5. In a friction device, opposed followers, a compression spring therebetween, one of said followers having an integral friction barrel with pairs of opposed internal friction surfaces arranged along axes in planes substantially at right angles to each other, a pair of opposed friction shoes seated against certain of said surfaces, resilient means under compression between said shoes, and means on the other of said followers for actuating said shoes, each of said friction shoes comprising a steel plate connected to said actuating follower and an iron portion integrally cast thereto for frictional engagement with said barrel.

6. In a friction device, spaced followers, a compression spring therebetween, one of said followers having an integral friction housing with opposed internal friction surfaces, friction shoes seated against said surfaces, resilient means under compression between said shoes, and means on the other of said followers for actuating said shoes, each of said friction shoes comprising a steel plate connected to the actuating follower and an iron portion integrally cast thereto for frictional engagement with said housing, each of the friction surfaces on said housing being defined by a radius substantially shorter than the internal radius of said housing.

7. In a friction device, spaced followers, a compression spring therebetween, one of said followers having an integral friction barrel with a series of internal arcuate friction surfaces therearound, certain of said surfaces being arranged along axes in planes substantially at right angles to each other, a pair of friction shoes selectively receivable in said barrel to seat against opposed friction surfaces of either pair, resilient means under compression between said friction shoes, and means on the other of said followers for actuating said shoes.

8. In a friction device, opposed followers, a compression spring therebetween, one of said followers having an integral friction barrel with pairs of opposed internal friction surfaces spaced from the ends of said barrel and arranged along axes in planes substantially at right angles to each other, a pair of opposed friction shoes selectively receivable in said barrel to seat against opposed friction surfaces of either pair, resilient means under compression between said shoes, and means on the other of said followers for actuating said shoes, each of the friction surfaces on said barrel being defined by a radius substantially shorter than the internal radius of said barrel, said friction surfaces terminating in a tapering shoulder adjacent the open end of said barrel and defining an enlarged portion accommodating the insertion of said shoes in assembly with the resilient means under compression therebetween.

9. In a friction device, spaced followers, a compression spring therebetween, one of said followers having an integral friction housing with opposed internal friction surfaces, friction shoes seated against said surfaces, resilient means under compression between said shoes, and means on the other of said followers for actuating said shoes, each of said friction shoes comprising a steel plate connected to the actuating follower and an iron portion integrally cast thereto for frictional engagement with said housing.

10. In a friction shoe, a steel body portion having means at one end for connection of actuating means and having an opening therethrough with flaring side walls, and an iron wear plate cast integral with said body portion and having means projecting through said opening to form spring positioning means on said shoe opposite said plate.

11. In a friction shoe, a steel plate portion having an eye at one end for actuation thereof and spaced openings with flaring side walls, and an iron wear plate cast integral therewith with portions extending into said openings, said wear plate having an arcuate friction face, and spring positioning means opposite said face.

12. In a friction shoe, a steel plate portion having a yoke end for actuation thereof and a plurality of openings therethrough with flaring side walls, and a friction portion cast integral with said plate portion with lugs extending through said openings to form spring positioning means.

ROBERT B. COTTRELL.